June 24, 1947. P. H. ODESSEY 2,422,742
METER FOR MEASURING MOISTURE CONTENT
Filed March 5, 1942 2 Sheets-Sheet 2
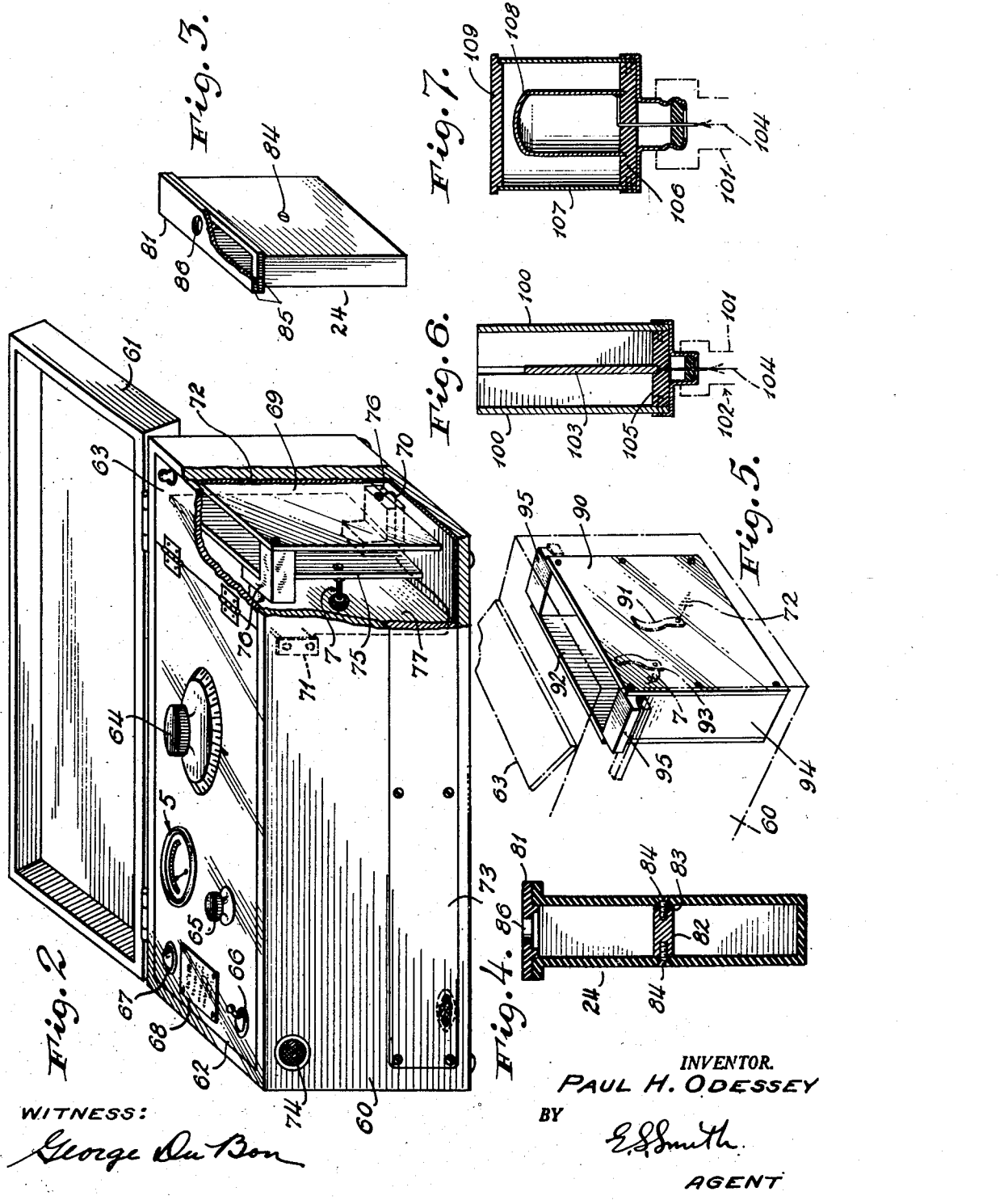
INVENTOR.
PAUL H. ODESSEY
BY
E. S. Smith
AGENT
WITNESS:
George Du Bon Patented June 24, 1947

2,422,742

UNITED STATES PATENT OFFICE 2,422,742

METER FOR MEASURING MOISTURE CONTENT

Paul H. Odessey, Brooklyn, N. Y., assignor, by mesne assignments, to Portable Products Corporation, Pittsburgh, Pa., a corporation of Pennsylvania Application March 5, 1942, Serial No. 433,438

13 Claims. (Cl. 175—183)

This invention relates to methods of an apparatus for measuring variable electrical conditions such as resistance or reactance including where an appreciable amount of resistance is included. It particularly relates to, but is not limited to, the measurement of the moisture content of a substance placed between the plates of a capacitor and is especially suited to the measurement of hygroscopic substances having relatively high dielectric losses.

A particular object of the present invention is to provide a measuring instrument which is more stable, more sensitive and more reliable than other known instruments for the purposes for which this invention is suitable. Its apparatus is also simpler and less expensive than would otherwise be the case as a result of the use of multiple-electronic tubes in such an efficient combination, only two tubes being required for its measuring circuit. Another object is to provide interchangeability of sample-containing test cells and/or capacitors for such cells.

This instrument is an improvement over other known devices of the dielectric type which also make use of heterodyne or beat frequency methods for detecting a small change of capacity since, in this instrument, a number of features cooperate to make it possible for extremely high sensitivity to be reliably attained without the loss of stability of oscillation, the circuit being so dependable in its operation that in the large number of cases in which the hygroscopic substance has a high moisture content, the sample may be placed directly between the bare metal plates of the capacitor without damping out the oscillations which are necessary to provide the beat frequency which operates a direct current ammeter, whose indications show when the measuring circuit which includes the test capacity and sample is at a standard frequency. This feature makes possible the use of an improved bare plate form of test cells for the hygroscopic material. The extremely high sensitivity obtainable with this improved device also makes possible and useful the provision of an interchangeable test cell whose capacity is brought to precisely a standard value by deformably altering the width of such cell. Another improved result of the use of my improved circuit is that it makes possible for the first time the use of other improved test cells which may be mounted at a more convenient location somewhat away from the instrument itself.

A number of improvements in the measuring circuit of my device which cooperate to provide extremely high sensitivity and also stability include, importantly, the provision of an output limiting means which keeps the amplitude of the difference frequency or beats substantially constant regardless of the changes in the amplitude of the current in the portion of the circuit which includes the test cell's capacitor.

Another important improvement is the provision of means for tuning a transformer for the difference frequency to provide a high power output of the transformer at a definite beat frequency which is extremely low relative to the standard frequency, thus providing an extremely sensitive and yet stable tuning of the portion of the circuit including the beat meter.

A related improvement is the provision of inductive coupling in the regenerative portion of the standard frequency circuit, a feature which eliminates a control which would be additionally necessary in case the usual capacitative coupling were to be attempted in this extremely sensitive device. Still another improvement which materially contributes to the simplicity of the device without interfering with the attainment of high sensitivity coupled with unusually high stability and reliability of operation lies in the selection of multiple-function electronic tubes in the particular structural relations utilized in the improved circuit hereinafter disclosed.

A reliable relation exists between the moisture content of a hygroscopic substance and its dielectric constant in a usefully large number of classes or substances which include, e. g., granular and powdered materials as well as liquids. The measurement in such cases may be accomplished by inserting the substance between the plates of the capacitor so that the dielectric of the capacitor includes a substance under test with the result that the measured capacity of the capacitor will provide a measurement of the dielectric constant and hence of the moisture content of the substance under test.

In general, this method is practicable except in the rare cases in which objectionable mechanical or chemical characteristics of the substance interfere. This technique, especially where removable test cells are used, has been found to be simple and accurate while requiring but little time with oils, shellac, various meals, malts and grains. A precision of $\frac{1}{10}\%$ moisture is generally obtainable. Even in cases where the characteristics of the substance are so harsh as to cause serious deterioration of the test cell, a measurement may be obtained and the test cell discarded after a single test since, following my invention, standard interchangeable test cells may be used and expended as required. This device is also suited for making purely electrical measurements.

Changes of resistance have been often used to provide reliable measurements of the moisture content of a wide variety of substances. However, the measurement of the dielectric constant of hygroscopic substances is desirable as being sometimes more reliable than resistance measurements and especially where a question as to the moisture distribution is involved. In many cases, it is desirable to substantially eliminate both the effect of changes of resistance and the dielectric effect of the test cell itself by the use of bare metal side walls as the plates of the test capacitor. An object of my invention is to provide a measuring circuit in which the oscillations powerfully tend to be stably maintained even though the substance in a bare plate test cell has relatively high value losses.

A test cell which is formed exclusively of insulating material makes use of both the capacity and the resistance of the sample in determining the moisture content of the latter where both the resistivity and capacity effects correspond with the moisture content. In general, the capacity increases and the resistance decreases as the moisture content increases although no all-inclusive law may be stated.

The insulated cell serves as a convenient means for holding certain materials between the plates of a capacitor to there act as dielectric. It also permits the measurement of substances having a much lower resistance than does the bare metal plate cell since, with the latter, the circuit tends to stop oscillating at a somewhat higher, but still low, value of the resistance of the sample than that for the insulated cell. Consequently the insulated cell must be used with samples of extremely low resistance. As long as the resistance of the sample does not vary with time, accurate measurements are equally feasible with either the insulated cell or the bare metal plate cell except for the limiting case mentioned above. In either case, the frequency tends to vary inversely as the square root of the capacity.

With the bare plate cell, a variation of the sample's resistance at the standard frequency has no appreciable effect upon the equivalent value of the capacity which determines the frequency. In radio frequency oscillators, the resistance of the tuned grid circuit generally has only a negligibly slight effect upon the frequency, an effect which decreases as the coupling decreases. Of course with any given coupling, there is a limit to the amount of feed-back power which is available to maintain oscillations and, consequently, there is a limit to the minimum value of the sample's resistance at which the circuit will oscillate. In other words, with the bare plate cell, the effect of changes of the sample's resistance on the equivalent capacity is negligible but the oscillations will fail or become unstable if this resistance becomes too low.

With the insulated cell, the relation between the equivalent capacity $C_{eq}$ of the capacitor system, comprising capacities $C_1$ and $C_2$ respectively of the sample and the cell, is $$\frac{1}{C_{eq}} = \frac{1}{C_1} + \frac{1}{C_2}$$

when the sample's resistance $R_1$ equals infinity since the capacities are then merely in series in effect, while for the other limiting value of $R_1=0$, i. e. with the capacity of a sample short-circuited out, $$\frac{1}{C_{eq}} = \frac{1}{C_2}$$

since only the capacity $C_2$ of the cell is then effective. For intermediate values it may be parenthetically noted that the equivalent capacity varies with the sample's resistance according to the following relation:

$$\frac{1}{C_{eq}} = \frac{1}{C_1 + \frac{1}{\omega^2 C_1 R_1^2}} + \frac{1}{C_2}$$

where $f$ is the frequency and the angular velocity $\omega = 2\pi f$. Since in the case of certain substances, the sample's resistance varies considerably with time and the changes of said resistance are much larger than the changes in the sample's capacity, the pure capacity measurement manifestly there provides the more reliable and accurate moisture indication. In other words, in cases where the resistance of the sample varies with time, the use of the bare plate cell is indicated along with a highly stable oscillator. However it is only fair to note that, with the constant frequency technique disclosed herein, the total effective capacity of the resonant circuit is constant and that consequently the sensitivity of the moisture measurement is substantially the same for both types of cell.

A further defense of the insulated cell is that it is superior to the bare plate cell in cases where, for example, the resistance change of the sample is greater than the capacity change with variations of moisture content. In such cases, the capacity method disclosed in the last equation is used in determining the resistance of the sample. An object of the invention is accordingly the determination of resistance changes by measuring related capacity effects.

Others in the moisture measurement art have employed the bare plate cell by making use of the impedance due to both resistance and capacity. However, it would appear at first that the resistance of the sample would have a relatively much greater effect with the bare plate cell than with the insulated cell since in the bare plate cell the resistance of the sample constitutes substantially the entire resistance while in the insulated cell, the resistance of the sample is only a small part of the total resistance of the sample plus cell in view of the generally much greater resistance of the insulated cell.

Instead, I have discovered and shown with the aid of the foregoing analysis that, by using a pure capacity measurement for cases where the resistance of the sample varies with time, the effect on the moisture measurement of the sample's resistance is paradoxically negligible with the bare plate cell even though the resistance effect in this case would offhand seem to be very much greater than with the insulated cell.

It may be parenthetically noted, in considering the dielectric effect of the insulation in a bare plate cell that the insulation is in parallel with the sample and consequently the total capacity is simply the sum of the capacities of the sample and of the insulation. Consequently, the effect of the insulation may be fully compensated for, when standardizing the instrument, by adjusting a variable capacitor in parallel with both the test cell and the calibrated capacitor. In case any parasitical appreciable capacity effects occur where the sample contacts the insulation, a bare plate test cell may obviously be inverted so that the sample does not come into contact with the insulation. The superiority of the bare plate cell in connection with a constant frequency circuit for moisture measurement by a purely capacitative method is thus further apparent.

Accordingly, an object of my invention is to develop a moisture meter of the bare plate type by including an unusually stable oscillator circuit so that the greater inherent accuracy of the bare plate cell may be had over much wetter samples than heretofore or for cases in which the sample's resistance varies considerably with time.

The measurement of the capacity is made by means of the substitution method. In making the test, the instrument is first standardized using an empty test capacitor, then a specific weight of the substance is placed between the plates of the test capacitor and the instrument is restored to the initial standardized condition, with the sample between the capacitor's plates, by means of a calibrated variable capacitor. The reading of this calibrated capacitor is converted into percent moisture content by means of tables compiled for the material under test.

The measurement is made at an intermediate radio frequency and makes use of the heterodyne or beat frequency principle of detecting small changes of capacity. Exclusive of the regulated D. C. power supply, the circuit consists of two radio frequency oscillators respectively of variable frequency and of constant frequency, and a heterodyne detector capable of detecting the difference frequency existing beween the two oscillators, and including means for observing these differences visually on a meter.

Any reasonably high potential source of direct current may be used to operate an electrical measuring instrument of this class. It may include batteries within the instrument casing or the D. C. supply may be derived from an A. C. supply by means of a rectifier power unit. Such a power unit consists of a transformer which supplies power to a full wave rectifier whose output is filtered by means of an inductance and a capacity. The power output of this unit may be regulated by means of a resistor shunted by a gas discharge tube between the output terminal of the resistor and the ground, such terminal serving as the positive point of the D. C. power supply to the capacity measuring instrument. By the use of such a power supply unit, A. C. power is converted into D. C. power having only a small A. C. ripple component. The combination of such a resistor and gas discharge tube reduces variations in the output voltage so that they are small compared with those of the voltage of the A. C. supply. This power supply unit is shown only diagrammatically since it is known to those skilled in the art.

Thus the chief objects are to provide methods and means for causing such a highly sensitive capacity meter, particularly a moisture meter of a dielectric type, to stably and reliably operate and particularly with respect to minimizing the damping effect due to a lowering of the resistance in the portion of the measuring circuit including the test capacity or, in other words, due to increased dielectric losses.

These and such other objects of the invention will appear to those skilled in the art from the accompanying drawings and specification in which is illustrated and described by way of example a specific embodiment of the invention. It is my intention to claim all that I have disclosed that is of a patentable nature.

Fig. 2 is a view, generally in perspective, of the outside of the moisture meter. It has a corner broken away to show the capacitor for the test cell.

Fig. 3 is a view, generally in perspective, of the test cell preferably used in the moisture meter shown in Fig. 2 with samples whose loss corresponds with the moisture content, one corner of its cover being shown broken away in Fig. 3. It is also preferably used with samples having such high loss as to damp out the circuit's oscillations with a bare metal plate cell.

Fig. 4 is a cross section of the test cell, shown in Fig. 3, and its cover taken at the mid section.

Figs. 5–7 are diagrammatic views of different forms of improved test cells in which bare metal plates are used in the capacitor and the hygroscopic material comes into direct contact with such plates, the preferred type for samples having losses varying with time.

Fig. 5 shows a two-plate capacitor with the outer plate grounded and the inner plate insulated from ground.

Fig. 6 shows a three-plate capacitor with the outside plate grounded and the shorter central plate insulated from ground.

Fig. 7 shows a generally cylindrical form in which the outside cylinder is grounded and the inner cylinder is insulated from ground and is the preferred form of the bare plate type of Figs. 5–7.

Figure 1:
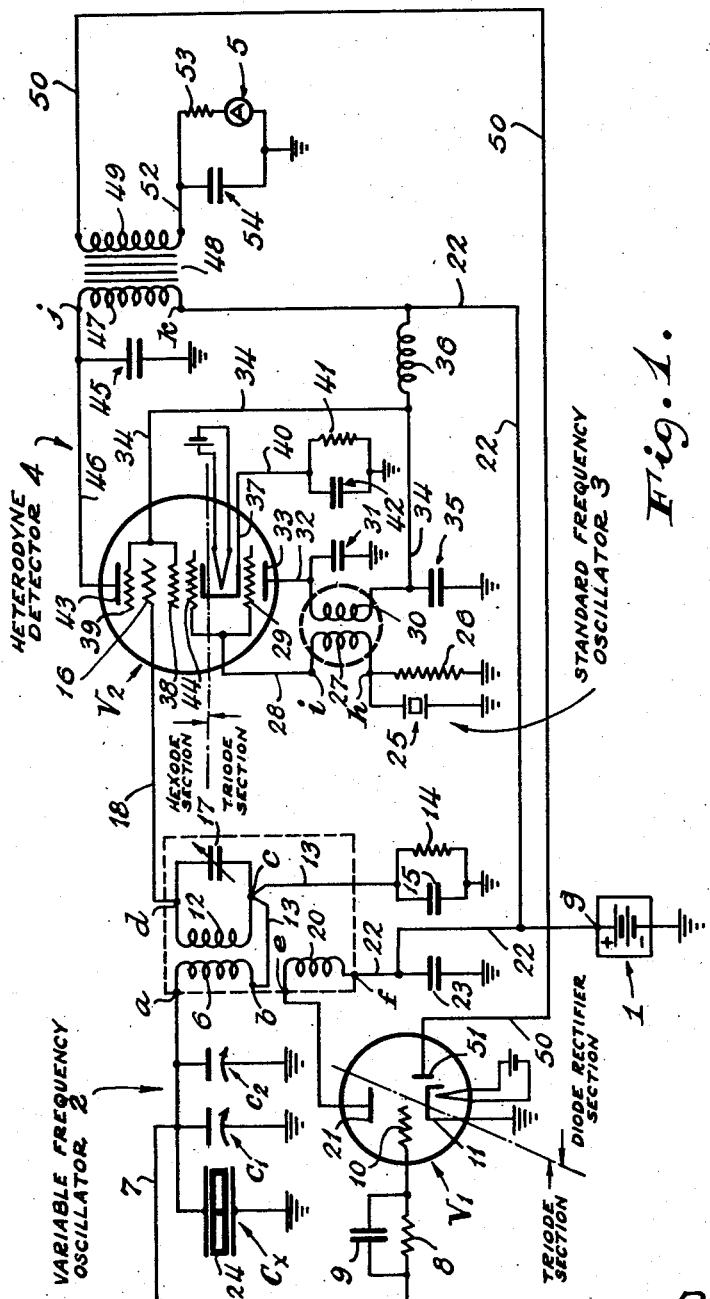
Fig. 1 is a diagram of the preferred circuit in which the preferred insulated form of a test cell for hygroscopic material is diagrammatically shown.

The devices of Figs. 5–7 are all detachable from electrical connections in their mountings. The cells of Fig. 6 and Fig. 7 are adapted for use with a coaxial cable which is external of the instrument casing.

Referring to Fig. 1, the instrument circuit includes as noted herein, the power supply unit 1, the variable frequency oscillator 2, a standard constant frequency oscillator 3, and a heterodyne detector 4 which includes a meter 5 that is sensitive to the heterodyne output of detector 4.

*Variable frequency oscillator*

This is in part a generally conventional radio frequency feed-back type oscillator. It comprises an oscillator coil 6, one terminal $a$ of which is connected by the line 7 with one side of: the test capacitor $C_x$, a calibrated variable capacitor $C_1$ and a frequency-standardizing capacitor $C_2$, the other sides of these capacitors being connected to the ground. Line 7 also connects terminal $a$ of oscillator coil 6 through the grid leak resistor 8 and its by-pass capacitor 9 to the control grid 10 of the triode section of tube $V_1$. The heating filament of this tube is connected to any suitable source of power, e. g. a battery as shown, and its cathode 11 is connected to ground. The other terminal $b$ of oscillator coil 6 is connected to one side, at terminal $c$, of a tuned output circuit which is loosely coupled to the oscillator coil 6. Line 13 connects points $b$ and $c$ to the ground through a parallel combination of resistor 14 and its by-pass capacitor 15. The function of the parallel combination of 14 and 15 is to provide an output control for the heterodyne detector 4 by means of a variable negative bias on the control grid 16 of the hexode converter section of tube $V_2$, which will be hereinafter more fully explained.

The tuned output circuit includes an adjustable capacitor 17 connected across coil 12 which is loosely coupled with oscillator coil 6. One side of coil 12 and of capacitor 17 has a common terminal c while the other side of 12 and 17 has a common terminal d connected by line 18 with the hexode control grid 16.

Also coupled to oscillator coil 6 is the feed-back coil 20 for the triode section of tube $V_1$. One terminal e of coil 20 is connected to the plate 21 of the triode section of tube $V_1$ and the other terminal f of coil 20 is connected by line 22 to the ground through a by-pass capacitor 23. Line 22 also serves to connect the positive terminal g of the power supply unit 1 with the plate 21 of the triode section of tube $V_1$ through coil 20. The capacitor 23 provides a low-impedance path for radio frequency components to the ground while allowing the D. C. supply to be carried to the circuit which includes plate 21 without being short-circuited to the ground. It is seen that the circuit of the variable oscillator is completed through the grounding of capacitors $C_x$, $C_1$ and $C_2$ and through the cathode 11 of tube $V_1$.

The frequency of the variable oscillator is varied by changing the capacity of any or all of the capacitor $C_x$, $C_1$ and $C_2$. In its use in capacity measurement, the frequency is adjusted to a standard or fixed value by means of the capacitor $C_2$ while the calibrated capacitor $C_1$ is at its zero reading with an empty test cell 24 between the plates of capacitor $C_x$. A known weight of the substance under test is put into the test cell 24 which is then placed between the plates of capacitor $C_x$. This alters the frequency of the variable frequency oscillator 2 from that for the empty test cell. The operator then manually adjusts the calibrated capacitor $C_1$ to restore the frequency to its initial standard value.

*Constant frequency oscillator*

The crystal 25 controls the standard frequency oscillator 3 and has one side connected to ground and the other terminal h connected through resistor 26 to ground. Terminal h is also the terminal of primary coil 27 of the feed-back transformer. The other end i of coil 27 is connected by line 28 with the control grid 29 of the triode section of tube $V_2$. The secondary coil 30 of the feed-back transformer, whose primary is coil 27, is tuned to the crystal frequency by means of a capacitor 31, one side of which is connected by line 32 with plate 33 of the triode section of tube $V_2$ and with one end of secondary coil 30. The other end of this coil 30 is connected to line 34 and to the ground through the radio frequency by-pass capacitor 35. Line 34 is connected by radio frequency choke 36 with line 22 from the common positive terminal of the D. C. power supply. Choke 36 eliminates any radio frequency effects which might otherwise appear in the positive D. C. line 34 due to stray coupling with other radio frequency components. Plate 33 is positive with respect to its cathode 37 which is adjacent a heating filament which is supplied from any convenient source of current, e. g. a battery as shown. Line 34 also is connected both to the screen grid 38 and to the suppressor grid 39 of the hexode section of tube $V_2$.

The cathode 37 of tube $V_2$ is common for both the hexode and triode sections and said cathode is connected to ground by line 40 through a self-biasing combination consisting of resistor 41 and its bypass capacitor 42, such connection to ground, of course, being without effect upon the frequency of the crystal controlled oscillator 3. The combination 41 and 42 is necessary for the operation of the hexode portion in order to establish proper operating conditions for the hexode section of tube $V_2$. The triode section of tube $V_2$ and the constant frequency oscillator 3 as a whole are designed to be stable over a wide range between extreme operating conditions and to operate at the natural frequency of the crystal over such range.

*Heterodyne detector*

Plate 43 of tube $V_2$ responds to the component frequencies developed through the electronic interaction of grid 44, that is directly coupled to the standard frequency oscillator 3, with grid 16 which is loosely coupled to the variable oscillator 2. In other words, portions of each of the outputs of the variable frequency and the fixed frequency oscillators are mixed by combining electrons in the space between the cathode 37 and the plate 43 of the hexode converter section of tube $V_2$.

This is accomplished by connecting the line 18, as earlier mentioned herein, to the loosely couple tuned output circuit of the variable oscillator, at the terminal d of coil 12 to be specific.

Part of the constant frequency output of the crystal oscillator is brought into the aforementioned inter-electrode space by means of a supplementary grid 44 connected to the control grid 29 of the triode section and located between the cathode 37 and the screen grid 38 of hexode section of tube $V_2$. The reaction of the output of both oscillators results in many frequency components, one of which is the difference frequency; the other components, having a much higher frequency, by-pass to the ground by means of a capacitor 45 to which plate 43 is connected by line 46.

The output of plate 43 is also carried by line 46 to one end j of the primary coil 47 of audio transformer 48, the other end k of coil 47 being connected by line 22 to the positive terminal g of the direct current supply unit 1. Primary coil 47 is tuned to a low audio frequency, e. g., approximately 100 cycles per second, by means of the fixed capacitor 45. This is but one way of obtaining a tuned resonant circuit; another would be the tuning of the circuit including the secondary coil 49.

One side of the secondary coil 49 of the audio transformer 48 is connected by line 50 with the plate 51 of the diode rectifier section of tube $V_1$. The other end of coil 49 is connected by line 52 through a resistor 53 in series with the D. C. milliammeter 5 to ground, line 52 being also connected to ground through a filter capacitor 54, the circuit being completed through the cathode 11 of tube $V_1$. Capacitor 54 acts as a low impedance path to ground for the A. C. components of the rectified audio frequency output while the D. C. component must flow exclusively through resistor 53 and meter 5.

The circuit of the heterodyne detector 4 thus includes the secondary 49 and the D. C. milliammeter 5. The function of this portion of the heterodyne circuit is to rectify the A. C. output of the audio transformer 48 so that the D. C. milliammeter 5, whose maximum capacity is preferably of the order of 1 ma., provides a visual measurement of the difference frequencies which originate in the hexode converter section of the tube $V_2$.

While the visual indication of meter 5 has been shown to enable the operator to manually adjust capacitor C1 of the variable frequency oscillator, it will be apparent to those skilled in the art that this may be done automatically instead of manually and also that, instead of adjusting C1, the moisture input to a continuous process might be directly governed by the milliammeter 5, e. g., through photoelectric or other means which would not interfere with the operation with the D. C. milliammeter 5.

When the difference frequency is in the neighborhood of zero and is equal to 100 cycles per second, the resonant frequency of the primary winding 47 of audio transformer 48, the output of transformer 48 will be a maximum and consequently the reading will also then be a maximum.

Since the difference frequency is the same for frequencies of the variable oscillator either slightly greater or less than the frequency of the oscillator 3, the meter 5 will first indicate a maximum deflection, then zero followed by a maximum again as the frequency of the oscillator 2 is changed continuously in either direction over this range. Zero deflection of meter 5, falling between the two maximum deflections obtained in the above manner, uniquely indicates that both oscillators 2 and 3 are operating at the same frequency and that the difference frequency is zero.

Due to the tuning of the resonant circuit consisting of condenser 45 and primary winding 47, maximum deflections occur in rapid succession about 200 cycles apart (approximately 0.04% of the standard frequency of 465,000 cycles per second which has been used by way of example) as the difference frequency is varied continuously in either direction. The occurrence of maximum meter deflections very close to the standard frequency greatly simplifies and facilitates the adjustment of the frequency of the variable oscillator to the standard frequency since in this manner the approaches to, and deviations from, the standard frequency are thereby visually amplified. This provides far sharper tuning than the conventional method of amplifying the output without changing the spacing of the peaks of the output and the width of the intervening "valley."

The general heterodyne peaks-and-valley criteria of detection is used occasionally in the prior art to determine that the frequencies of the two oscillators are precisely equal. By the herein-disclosed method, extremely small differences of frequency can be readily detected with great sensitivity. Equality of the two frequencies serves as a basic reference point in the measurement of capacity.

The measuring circuit is initially adjusted to this condition with an empty test cell in capacitor Cx and, then after the cell containing the sample is inserted between plates of capacitor Cx, thereby altering the frequency of the variable oscillator 2, the circuit is restored to this same condition by means of calibrated condenser C1. The difference between the two settings of C1 is a measure of the capacity change introduced by the sample under test and hence a measure of its moisture content.

Output control means

Now that the measuring circuits as a whole have been described, the output control feature, which is provided by the inclusion in the circuits of grids 10 and 16 of the resistor 14 with its by-pass capacitor 15, may be further described as follows:

As noted earlier, the resistor 14 and capacitor 15 respectively form paths for the d. c. current to the grid 10 of tube V1 and for the radio frequency component of the current of said grid.

Upon placing a sample of high dielectric loss between the plates of capacitor Cx, there is a corresponding reduction of the amplitude of the generated radio frequency voltage oscillations across Cx and of the radio frequency component of the voltage across primary coil 6 and hence a proportional reduction of the radio frequency voltage across its secondary coil 12, thereby decreasing the radio frequency voltage applied to the control grid 16 of tube V2, which effect taken alone would tend to reduce the amplitude of the oscillations of the output from hexode plate 43 of tube V2 which is controlled by the grid 16.

But the inclusion of the resistance 14 and its by-pass capacitor 15, for the grid current of tube V1, in the circuit of the control grid 16 of the tube V2 has a compensating effect which is brought about as follows:

The reduction of the amplitude of the generated radio frequency voltage across Cx is also accompanied by a proportional reduction in the d. c. current to grid 10 of tube V1. Consequently the voltage drop across resistor 14 likewise decreases and hence correspondingly reduces the negative bias of the control grid 16 of tube V2. This shifts the cut-off voltage to increase the gain of the output circuit of the converter tube. The same function may be otherwise attained as by making use of, e. g., a non-linear characteristic of the converter tube. As a result, the output from plate 43 of tube V2 would increase if it were not for the fact that the amplitude of the generated radio frequency voltage across Cx and the amplitude of the radio frequency signal to be impressed upon the control grid 16 were also reduced as stated in the preceding paragraph.

The net and important result is that one effect substantially off-sets the other and eliminates, in the meter circuit, a manually adjusted volume control which otherwise would be necessary.

Anyone skilled in the art will recognize that the grid leak for tube V1 includes resistors 8 and 14 in series, with the result that the resistor 14 not only serves as an output control for tube V2 but additionally functions as an appreciable part of the grid leak for tube V1. It may be parenthetically noted that the D. C. current of control grid 16 of tube V2, if present, is relatively much smaller and helps to keep constant the output from tube V2 with a negligible effect upon the functioning of tube V1. One skilled in the art, when facing any particular application, can readily fit suitable values of the resistances and capacities of resistors 8 and 14 and their by-pass capacitors 9 and 15 respectively. For example in a typical moisture meter, the values are as follows: resistor 8—250,000 ohms, resistor 14—20,000 ohms, capacitor 9—70 mmf., and capacitor 15—0.1 mf.

By using the automatic bias control described, no adjustments are necessary to increase or decrease the sensitivity of the meter 5 which otherwise would deflect weakly or go off-scale in the moisture measurement of hygroscopic substances whose dielectric losses are respectively high or low.

Operation of the device of Fig. 1

As earlier mentioned herein, the variable oscillator is first standardized with the test capacitor Cx empty and the calibrated capacitor C1 set at its zero which corresponds with its maximum capacity. Capacitor C2 is then adjusted to make the frequency of the variable oscillator equal to that of the fixed oscillator. This equality is determined by continuing the adjustment until there is obtained a null reading of the meter 5. The null reading falls between two successive maximum readings as the capacitor is turned in one direction. After the circuit has been standardized, capacitor $C_2$ is left undisturbed throughout the remaining procedure.

A specific weight of the hygroscopic sample is then placed between the plates of $C_x$ and the null reading of meter 5 is again obtained by similarly adjusting the calibrated capacitor. The reading of the scale for this calibrated capacitor indicates the difference between its initial and final settings and, as such, is a measure of the capacity change introduced by the test sample.

By testing samples of the same substance while varying its moisture content, a conversion table is obtained giving the relation between moisture content and capacity of the substance under test. This empirical table is then used in testing for the moisture content of other samples of the same substance.

It is also noteworthy that the tuning of the primary of the audio transformer 47 by means of capacitor 45 considerably increases the sensitivity of the meter 5, i. e., the measurement deflections of the meter 5 on each side of the null reading are brought extremely close together by this arrangement so that, in the neighborhood of the standard frequency, the meter acts very sensitively with respect to small frequency changes. Due to this fixed tuning, the change from null to maximum meter indication is brought to within approximately 0.02% in the instrument discussed by way of example since in such case the resonant audio frequency is only about 100 cycles per second while the standard constant radio frequency is 465,000 cycles per second.

From the foregoing description of the device and its operation, it will be evident to those skilled in the art that such a stable, highly sensitive oscillating circuit has been provided, particularly by the output control feature, as to make possible the use of reliable moisture measurements of a hygroscopic substance between the bare plates of a test capacitor by the use of purely capacitative relations in spite of heavy damping due to a high dielectric loss (i. e. a low shunting resistance) of the material between the plates of the test capacitor $C_x$. However, the volume limiting combination 14 and 15, the stable and efficient inductive coupling of the oscillator coils 27 and 30 for the standard frequency oscillator 3, and the use of a tuned audio transformer 48 of the heterodyne detector 4 all cooperate to provide an improved circuit which tends to stably oscillate and hence to provide a beat meter 5 to enable highly accurate readings of the calibrated condencer $C_1$ to be made in spite of either such a high loss in or such a low shunting resistance for test capacity $C_x$ as would damp out the oscillations of any earlier known capacity meters of the heterodyne type. But the invention is not at all limited to capacity-type meters having bare metal plates in contact with the dielectric. Instead, the main commercial field uses the preferred embodiment in which the test material is put into a test cell molded from an insulating plastic.

In Figs. 2–4 is shown the preferred embodiment of the invention. For convenience, the entire power supply and measuring instrument may be combined as indicated within a single case 60 which for convenience is provided with a detachable cover 61. A metal plate 62 acts as a top side of case 60 and is provided with a metal door 63 which is grounded by its hinges upon the metal plate 62. Supported by the plate 62 is the milliammeter 5 in a location to be readily visible to the operator while he manipulates with his right hand the knob 64 of the calibrated capacitor $C_1$ or knob 65 of capacity $C_2$ for standardizing the instrument with an empty test cell between the plates of the test capacitor $C_x$ whose capacity when empty is set to a standard value by use of the adjustable screw-end of line 7 shown in Fig. 2.

A switch 66 is provided for the entire power supply including unit 1. Pilot light 67 serves to indicate whenever the power is on in power supply unit 1. A plate 68 of operating instructions is also provided. The outer plate 69 of capacitor $C_x$ is connected by line 70 with a terminal 71 on the thin metal ground sheet 72 which preferably adheres to the inner walls of casing 60 and is in substantially conductive contact with the metal top 62 and its door 63. This shielding arrangement completely eliminates radiation or reception of radio frequency impulses as well as the effect of stray capacities of external objects in the vicinity of the instrument.

Casing 60 is provided with a cover 73 for a service entrance and clean-out opening, i. e. cover 73 is removable to permit the interior to be accessible for inspection and for maintenance and at the same time to enable an operator to clean out any material which may have fallen into the space around the test capacitor $C_x$. The casing is also provided with two screened air vents 74 which permit heated air to escape and hence serve to keep the instrument cool with the result that its stability is likewise increased.

The inner plate 75 of test capacitor $C_x$ is insulated from the outer plate 69 by insulating blocks 76 upon which both plates 75 and 69 are mounted. Plate 75 is connected by line 7 with the grid leak 8 for the variable frequency oscillator triode section of tube $V_1$. Wooden wall 77 is not provided with any metal sheet.

The test cell 24 and its cover 81 are shown in Figs. 3 and 4 and are made of dielectric material in the preferred embodiment, a fixed weight of sample being inserted in the test cell when a measurement is desired. Test cell 24 is provided with a cylindrical spacer block 82 with one or more spacing washers 83, to provide a standard cell-capacity, inserted between the walls of test cell and the block 82. These elements are then fastened by means of screws 84, after which the cells are finished and interchangeable, i e., have a standard electrical capacity when containing a standard weight of a standard substance such as dry granulated quartz. One end of each test cell 24 and its cover 81 are provided at 85 with a colored indication so that the operator will not place them in the reverse direction, 180° in azimuth, from that for which the cell has been standardized. The cover is provided with a small hole 86 in which a thermometer may be placed so that a temperature correction may be made for the measurement of the substance under test.

The use of this convenient test cell, which is instantly removable from the instrument, permits great flexibility in the handling of liquid or solid test samples. This cell is also useful in developing methods for certain materials that exhibit peculiar properties and is of advantage in obtaining uniform packing for granular and powdered materials since the loaded cell can be shaken in a standard manner before the test. It also allows great versatility in handling of samples, weighing, and the setting up of a large number of samples in test cells for moisture determinations with economy of time and effort. Fig. 1 shows diagrammatically this preferred test cell in the circuit disclosed.

The technique of measuring moisture by means of this instrument is simple and requires little time. Notable also is the versatility of the instrument, its use being practicable not only for a great variety of materials but also for purely electrical measurements.

*Figs. 5–7*

These show bare plate modifications of a test cell. In the test cell of Fig. 5, the outer plate 90 is connected by spring connection 91 (shown by dot-dash lines) to the metal ground sheet 72. The inner plate 92 is connected by spring connection 93 (likewise in dot-dash lines) to line 7 which is connected as before to the grid leak 8 of the triode section of tube V1. Plates 90 and 92 are physically connected to a molded insulated spacer 94 which seals the sides and bottom of the test cell to cause the test cell to form a cup. The upper ends of spacer 94 are provided with lugs 95 which rest upon corresponding shelves in the casing 60. The construction is such that, as with the cell of Figs. 1–4, an operator can manipulate the test cell as required in filling it and thereafter can readily place the test cell in position for measurement and later remove it readily.

Another bare plate modification of a rectangular test cell is somewhat diagrammatically shown in Fig. 6. In this modification, outer plates 100 are provided and together detachably electrically connected to an outer conductive covering 101 of a coaxial cable 102, covering 101 being grounded on metal sheet 72. An inner plate 103 is somewhat shorter than plates 100 and is detachably electrically connected to the central conductor 104 of the coaxial cable 102. Molded insulation 105 generally corresponds with that 94 of the cell of Fig. 5.

At the other end of the coaxial cable, the covering 101 is similarly detachably electrically connected to the instrument's grounding sheet 72 and the central conductor 104 is similarly connected with line 7. This use of a flexible coaxial cable has the considerable advantage in many cases of permitting samples to be tested in a location which is more convenient for sampling purposes than that of the instrument itself. To prevent radiation effects, a metallic cover and shielding for the end walls are provided although not shown.

The modification of Fig. 7 is generally similar to that of Fig. 6 as to the use of the coaxial cable and an inner plate, the outer plate or plates being grounded in both cases and separated from the inner plate by a molded insulation separator 106. A metallic cover 109 is provided. In the embodiment of Fig. 7, the outer plate 107 is made cylindrical but is detachably electrically connected with the conductive covering of the coaxial cable generally as in Fig. 6, a conventional screw connection being slightly less diagrammatically shown however. The plate 108 is a domed cylinder mounted concentrically within cylindrical plate 107 and electrically connected with central conductor 104 of the coaxial cable generally as in Fig. 6. The detail of the detachable plate with the coaxial cable is somewhat diagrammatic in each instance. For a certain class of substances, it is an advantage to be able to shake the test cell bodily while taking the readings. In such cases, the use of test cells of Figs. 6 and 7 is particularly desirable where many readings must be taken.

As earlier mentioned herein, the use of bare plate test cells is believed by me to be made feasible with high loss samples for the first time by the use of the highly stable, yet sensitive, oscillating circuit of Fig. 1.

While it is old in meters using the heterodyne principle to amplify the audio output, this still leaves an objectionable width of the nearly flat bottom of the valley. By providing a tuned low audio frequency (of e. g. 100 cycles per second) in the load network, I have proceeded in the opposite direction from the known teachings of the audio receiving art in which efforts are made to reduce the values of inductance and capacity to a minimum so that the resonant audio frequency will be raised well above 5,000 cycles per second with the result that harmonics will not be unduly distorted. In such receivers, the low audible note of 100 cycles per second in resonance would of course be intolerable.

The terms and expressions which I have employed are used in the specification as terms of description and not of limitation, and I have no intention, in the use of terms and expressions in the claims, of excluding any equivalents of the features shown and described and portions thereof, but recognize that various modifications are possible within the scope of the invention claimed.

It is clear from the foregoing method of operation that the means for adjusting the frequency of the variable oscillator to the standard value can be otherwise attained as, e. g. by using the graduated variable capacitor $C_1$. In this alternative case, the index of the graduated variable capacitor may be shifted to provide a zero reference index for the measurement. The terms "insulation-cell" as used in the claims and "insulated cell" as used loosely in the foregoing specification can be regarded in a general sense more specifically as a cell substantially entirely consisting of insulating material having an extremely high resistance and a relatively low dielectric constant. Also where in the claims the term "equivalent capacity" is used, it is meant to designate the reactive component of the total impedance due to the test cell and the material inserted in the test cell and is that capacity which if substituted for a mixture of resistance and capacity, would give the same reading on meter 5.

I claim:

1. In a device of the measuring and controlling class which is sensitive to the capacity of an element, the combination of a standard frequency oscillator; a variable frequency oscillator having a first electronic tube and including a circuit for regeneratively applying an oscillating voltage to said element at a frequency which depends upon the latter's capacity, and means for bringing the variable frequency to the standard with, upon an increase of the energy loss in said element, a decrease both of the amplitude of the stated voltage oscillation, of the average value of the D. C. current to the control grid of said tube, and of the oscillating output of the variable frequency oscillator; a heterodyne circuit having an electronic frequency converter tube, an output circuit, and a circuit coupling the converter tube's control grid with the output of said first tube so that the converter tube's grid voltage oscillations tend to decrease in amplitude proportionally with a decrease of the oscillating output of said variable frequency oscillator which causes the amplitude of the oscillating output of said converter tube to decrease; and a control device for maintaining substantially constant the oscillating output of said converter tube regardless of changes of the stated energy loss, which control device comprises a resistor and a frequency component by-pass capacitor, said control device being connected in the control grid circuits of both said tubes and tending, upon a decrease of the average value of the D. C. grid current of said first tube and hence a decrease of the stabilized average value of the negative D. C. voltage in said circuit to said converter tube's control grid, to proportionally decrease the negative D. C. bias of the last mentioned grid and hence to proportionally increase the gain of the output circuit of said converter tube, whereby, upon an increase of said energy loss in the element, the earlier stated tendency to decrease the oscillating output of said converter tube is compensatingly offset by the later stated simultaneous tendency to increase the oscillating output of said converter tube.

2. In a device of the measuring and controlling class which is sensitive to the capacity of an element, the combination of a standard frequency oscillator; a variable frequency oscillator having a first electronic tube and a circuit for applying an oscillating voltage to said element at said standard frequency; a heterodyne circuit having an electronic frequency converter tube and a circuit coupling its control grid with the output of said first tube; and a control device electrically connected to said control grid and governed by the D. C. grid current of the first tube to automatically maintain substantially constant the oscillating output of said converter tube regardless of changes of the energy loss in said element.

3. In a device of the measuring and controlling class which is sensitive to the capacity of an element, the combination of a standard frequency oscillator; a variable frequency oscillator having a first electronic tube and a circuit for applying an oscillating voltage to said element at said standard frequency; a heterodyne circuit having an electronic frequency converter tube and a circuit coupling its control grid with the output of said first tube; and a control device for automatically maintaining substantially constant the oscillating output of said converter tube regardless of changes of the energy loss in said element, which control device comprises a resistor and its frequency component by-pass capacitor, said control device being connected in the control grid circuits of both said tubes with said resistor effective as at least a portion of the grid leak of said first tube.

4. In a device of the measuring and controlling class which is sensitive to the capacity of an element having appreciable radio frequency energy loss, the combination of a standard radio frequency oscillator; a variable radio frequency oscillator having a first electronic tube and a circuit for regeneratively applying an oscillating voltage to said element at a frequency which depends upon the latter's capacity, and including means for bringing the variable frequency to that of the standard frequency oscillator; a heterodyne circuit having an electronic frequency converter tube and a circuit coupling its control grid with the output of said first tube; a control device governed by the grid current of the first tube to automatically maintain substantially constant the maximum oscillating output of said converter tube regardless of changes of the energy loss in said element; a meter whose indication depends upon the value of an impressed voltage; and means coupling said radio frequency oscillators with said meter and including a network having a transformer whose primary coil is connected with an output portion of said heterodyne circuit to vary the voltage across said primary coil in accordance with the difference between the variable and standard radio frequencies, a secondary coil connected to said meter to impress a voltage across said meter, and means for tuning the transformer to operate efficiently at a low audio frequency to provide a minimum voltage across the meter when the variable and standard radio frequencies are identical and a maximum voltage when the difference frequency is substantially equal to the stated tuned audio frequency.

5. A device of the measuring and controlling class which is sensitive to resistivity and dielectric effects of a sample whose resistivity and dielectric effects correspond with the moisture content, the combination of a standard radio frequency oscillator; a capacitor including a cell for containing a predetermined amount of the sample said cell being constructed of insulating material to have a substantial portion of the insulating material as a dielectric in series with the sample in the field of the capacitor; a variable radio frequency oscillator having a first electronic tube and a circuit for regeneratively applying an oscillating voltage to said capacitor at a frequency which depends on the latter's capacity and an empty or loaded cell therein at said standard frequency; a heterodyne circuit having an electronic frequency converter tube and a circuit coupling its control grid with the output of said first tube; a control device governed by the grid current of the first tube to automatically maintain substantially constant the oscillating output of said converter tube regardless of changes of the energy loss in said element; and a meter connected to an output portion of the heterodyne circuit to indicate the oscillating output of the converter tube and hence the difference frequency; a portion of the variable frequency oscillator being adjustable in accordance with the stated indication of said meter to reduce the difference frequency substantially to zero, whereby the stated adjustment of said variable frequency oscillator portion corresponds with the moisture content.

6. In a device of the measuring and controlling class which is sensitive to dielectric effects of a sample whose dielectric effects correspond with its moisture content, the combination of a standard radio frequency oscillator; a detachable cell for containing a predetermined amount of the sample; a variable radio frequency oscillator having a first electronic tube and a circuit for applying an oscillating voltage across said cell when the cell is attached to the device as a reactive portion of said circuit whose capacity affects the variable frequency; a heterodyne circuit including the output of the standard frequency oscillator and having an electronic frequency converter tube and a circuit coupling the converter tube's control grid with the output of said first tube; a control device governed by the grid current of the first tube to automatically maintain substantially constant the maximum oscillating output of said converter tube regardless of changes of the energy loss in said sample; and a meter connected to an output portion of the heterodyne circuit to indicate the oscillating output of the converter tube and hence the difference frequency; a portion of the variable frequency oscillator being adjustable in accordance with the stated indication of said meter to reduce the difference frequency substantially to zero, whereby the stated adjustment of said variable frequency oscillator portion substantially corresponds with the moisture content as it affects the dielectric effects of the sample in said cell.

7. In a device of the measuring and controlling class which is sensitive to resistivity and dielectric effects of a sample whose resistivity and dielectric effects correspond with its moisture content, the combination of a standard radio frequency oscillator; a detachable bare metal plate capacitor cell for containing a predetermined amount of the sample and constructed to have a negligible portion of insulating material as a dielectric in series with the sample in the field of the capacitor; a variable radio frequency oscillator having a first elecronic tube and a circuit for applying an oscillating voltage across said cell when the cell is attached to the device as a reactive portion of said circuit whose capacity affects the variable frequency; a heterodyne circuit including the output of the standard frequency oscillator and having an electronic frequency converter tube and a circuit coupling the converter tube's control grid with the output of said first tube; a control device governed by the grid current of the first tube to automatically maintain substantially constant the maximum oscillating output of said converter tube regardless of changes of the energy loss in said element; and a meter connected to an output portion of the heterodyne circuit to indicate the oscillating output of the converter tube and hence the difference frequency; a portion of the variable frequency oscillator being adjustable in accordance with the stated indication of said meter to reduce the difference frequency substantially to zero, whereby the stated adjustment of said variable frequency oscillator portion substantially corresponds with the moisture content as it affects the dielectric effects of the sample in said cell and is substantially independent of variations of the resistivity of the sample.

8. In a moisture meter for hygroscopic substances and including a radio frequency device whose frequency is sensitive to changes in the capacity of a capacitor, the combination of a cell constructed of insulating material to contain the sample to be tested and to be readily insertable between the plates of said capacitor, shielding completely surrounding said device and said capacitor and electrically connected to one portion of said device and including a door of shielding connected to the remainder of the shielding and removably closing an opening in such shielding through which the cell may be inserted between the plates of said capacitor, one plate of the capacitor being adjacent to the shielding and connected electrically therewith and the other plate of the capacitor being adjacent the device and connected electrically with another portion of the radio frequency device so that the capacitance of said capacitor affects the frequency of said device, and means for varying the spacing of the plates of the capacitor to very precisely predetermine the electrical capacity of the entire capacitor.

9. The combination set forth in claim 8 including means for deforming one of said plates to adjust the spacing between said plates to a predetermined value.

10. A device of the measuring and controlling class which is sensitive to an impedance effect of a sample comprising, in combination, an electrical measuring instrument, a cell constructed to contain a predetermined amount of the sample and to be readily attachable to and detachable from said instrument, and a shielding means completely surrounding said instrument and said cell when the cell is in a testing position; said instrument comprising: a standard radio frequency oscillator; a variable radio frequency oscillator having a first electronic tube and a circuit including a two-element means for applying an oscillating voltage across said cell when the cell is attached to the instrument in the testing position, said two-element means being constructed to then have the respective ones of said elements electrically connected with the shielding means and with a portion of the variable frequency oscillator which governs the frequency of the latter to affect the latter's frequency in accordance with the sample's stated impedance effect, and means for bringing the variable frequency to the standard frequency; a heterodyne circuit having an electronic frequency converter tube and a circuit coupling its control grid with the output of said first tube; a control device governed by the grid current of the first tube to automatically maintain substantially constant the maximum oscillating output of said converter tube regardless of changes of the energy loss in the sample; a meter whose indication depends upon the value of an impressed voltage; and a network having a transformer whose primary voltage varies in accordance with the output of the heterodyne circuit and hence with the difference between the variable and standard radio frequencies, a secondary coil connected to said meter to impress a voltage across said meter, and means for tuning the transformer to operate efficiently at a low audio frequency to provide a minimum voltage across the meter when the variable and standard radio frequencies are identical and with a maximum voltage across the meter when the difference frequency is substantially equal to the stated tuned audio frequency.

11. The combination set forth in claim 1 in which said resistor has such a value that each swing of the oscillating voltage of the control of the converter tube is varied beyond the cut-off value of the converter tube, the combination including a resistor in the cathode circuit of the converter tube for determining said cut-off value.

12. In a moisture meter for hygroscopic substances and including a radio frequency voltage device whose frequency is sensitive to changes in the capacity of a capacitor having two spaced plates, the combination of a detachable cell which is constructed to contain a sample of a hygroscopic substance and to be insertable between the capacitor plates to then be subject to the radio frequency field between said plates to then vary said frequency in accordance with the value of an electrical characteristic of the sample which corresponds with the moisture content when said cell is loaded with a standard weight of sample, and shielding completely surrounding said device and including a door of shielding material connected to the remainder of the shielding and constructed to be movable for admitting the cell to an operating position within the shielding and for removing the cell from the shielding, said capacitor plates being electrically connected with the radio frequency device to apply the said radio frequency voltage to the cell when the cell is in the operating position to then impose said radio frequency field across the sample when the cell is loaded, said plates being constructed and arranged to have one plate of said capacitor adjacent the shielding and also electrically connected therewith and to have the other plate of said capacitor adjacent said device and connected with a portion thereof which governs the frequency.

13. In a moisture meter for hygroscopic substances and including a radio frequency device whose frequency is sensitive to changes in the capacity of a capacitor, the combination of a cell constructed of insulating material to contain the sample to be tested and to be readily insertable between the plates of said capacitor, said cell having walls relatively adjustably deformable to very precisely predetermine the electric capacity of the cell and sample when said cell is loaded with a standard weight of a standard reference substance, and shielding completely surrounding said device and said capacitor and connected electrically to one portion of said device and including a door of shielding material electrically connected to the remainder of the shielding and removably closing an opening in such shielding through which the cell may be inserted between the plates of said capacitor, one plate of the capacitor being adjacent to the shielding and also connected electrically therewith and the other plate of the capacitor being adjacent the device and connected electrically with another portion of the radio frequency device which governs the frequency.

PAUL H. ODESSEY.

REFERENCES CITED

The following references are of record in the file of this patent:

UNITED STATES PATENTS

| Number | Name | Date |
|---|---|---|
| 2,266,114 | Bartlett | Dec. 16, 1941 |
| 2,282,092 | Roberts | May 5, 1942 |
| 1,983,665 | Hickok | Dec. 11, 1934 |
| 2,254,023 | Wright et al. | Aug. 26, 1941 |
| 2,076,441 | Berry | Apr. 6, 1937 |
| 2,069,046 | Rabezzana | Jan. 26, 1937 |
| 1,878,109 | Clark | Sept. 20, 1932 |
| 2,043,241 | Eyer | June 9, 1936 |
| 2,162,335 | Jacob | June 13, 1939 |
| 2,086,892 | Barton | July 13, 1937 |
| 2,276,672 | Roberts | Mar. 17, 1942 |

FOREIGN PATENTS

| Number | Country | Date |
|---|---|---|
| 396,098 | Great Britain | July 31, 1933 |